(12) United States Patent
Yu et al.

(10) Patent No.: US 7,018,470 B2
(45) Date of Patent: Mar. 28, 2006

(54) RUBBING DEVICE

(75) Inventors: Jeong-Su Yu, Daejeon (KR);
Jong-Sung Park, Cheongju (KR);
Du-Hyun Shin, Daejeon (KR);
Kum-Suek Seo, Cheongju (KR)

(73) Assignee: LG Chem, Ltd., (KR)

( * ) Notice: Subject to any disclaimer, the term of this patent is extended or adjusted under 35 U.S.C. 154(b) by 286 days.

(21) Appl. No.: 10/466,024

(22) PCT Filed: Nov. 21, 2002

(86) PCT No.: PCT/KR02/02182

§ 371 (c)(1),
(2), (4) Date: Jul. 10, 2003

(87) PCT Pub. No.: WO03/044593

PCT Pub. Date: May 30, 2003

(65) Prior Publication Data

US 2004/0241326 A1     Dec. 2, 2004

(30) Foreign Application Priority Data

Nov. 22, 2001   (KR)   ............... 2001-0073130

(51) Int. Cl.
*B05C 1/14*     (2006.01)
(52) U.S. Cl. ................. 118/106; 118/257; 118/76
(58) Field of Classification Search ............... 118/106, 118/257, 76; 427/11, 38, 162, 163.1, 164, 427/165, 346, 355, 359, 365; 349/1, 126, 349/127, 129, 130, 132, 191; 451/296, 336, 451/347, 424, 357, 358
See application file for complete search history.

(56) References Cited

U.S. PATENT DOCUMENTS

| | | | | |
|---|---|---|---|---|
| 4,895,098 A | * | 1/1990 | Akagawa et al. | ............ 118/56 |
| 5,390,037 A | | 2/1995 | Negishi | ............ 359/76 |
| 5,853,801 A | | 12/1998 | Suga et al. | ............ 427/164 |
| 5,899,794 A | * | 5/1999 | Shige et al. | ............ 451/41 |
| 6,905,752 B1 | * | 6/2005 | Ebihara et al. | ............ 428/90 |

FOREIGN PATENT DOCUMENTS

| | | |
|---|---|---|
| JP | 62-234128 | 10/1987 |
| JP | 6-242316 | 9/1994 |
| JP | 8-184833 | 7/1996 |
| KR | 2000-0012120 | 2/2000 |

* cited by examiner

*Primary Examiner*—Laura Edwards
(74) *Attorney, Agent, or Firm*—Cantor Colburn LLP

(57) ABSTRACT

The present invention provides a rubbing device including a base roller assembly that suspends and suspends and otherwise supports a base film to convey the same in one direction; a rubbing roller assembly that suspends and otherwise supports a rubbing cloth, and that moves the rubbing cloth in a direction opposite a conveying direction of the base film to thereby realize a rubbing treatment by contact between the rubbing cloth and the base film; and a rotating apparatus provided under the rubbing roller assembly and that rotates the entire rubbing roller assembly to a particular angle greater than 0° and up to and including 180° in the clockwise or counterclockwise direction with respect to the conveying direction of the base film.

14 Claims, 7 Drawing Sheets

RUBBING DEVICE

BACKGROUND OF THE INVENTION (a) Field of the Invention

The present invention relates to a rubbing device used in the manufacture of an optical compensation film. More particularly, the present invention relates to a rubbing device that allows for the setting of a rubbing angle with respect to a moving direction of a base film as desired, and enables interconnection of films using a continuous roll-to-roll process.

(b) Description of the Related Art

The optical characteristics of a liquid crystal display panel are controlled by the application of a polarization film, a retardation film, and an optical compensation film. The optical compensation film includes a liquid crystal polymer having a predetermined orientation, and acts to adjust a color shift and a contrast ratio of the liquid crystal panel to ensure a wide viewing angle. A conventional $\lambda/4$ retardation film that varies a polarization pattern may be used for the optical compensation film.

Such an optical compensation film is manufactured by performing a rubbing treatment on a surface of the base film such that a valley of a predetermined direction is formed on the surface of the base film, after which a liquid crystal material is deposited on the base film to orient liquid crystal molecules between the valleys.

In the conventional rubbing treatment, a rubbing cloth and the base film are each respectively wound around a rubbing roller and a base roller, and in a state where the rubbing cloth is in contact with the base film, the rubbing roller is rotated in a direction opposite the direction of movement of the base film. As a result, rubbing occurs between the rubbing cloth and the base film. The rubbing direction is typically in the direction of movement of the base film.

However, there are instances when it becomes necessary to set a light transmission axis of the optical compensation film at a predetermined angle with a light transmission axis of the polarization film or another optical compensation film. The light transmission axis of the optical compensation film is determined by the rubbing direction, while the light transmission axis of the polarization film is the same as a stretching direction of the polarization film.

Accordingly, with reference to FIG. 1, a polarization film 1 is tensed in a direction A such that the polarization film 1 is manufactured having a light transmission axis in the direction A. Further, a rubbing treatment is performed on a base film 3 in the direction A while it is also moved in the direction A, and a liquid crystal material is deposited on the base film 3 to thereby produce a light compensation film 5. The light compensation film 5 is then cut diagonally at a predetermined angle.

Subsequently, the polarization film 1 and the light compensation film 5 are combined into an integral unit while each has a light transmission axis of a predetermined angle. (Direction B in the drawing indicates the light transmission axis of the light compensation film 5.)

However, in the above method, since the films are individually manufactured in separate lines before being combined into a single unit, manufacture is complicated and overall production costs are increased. Further, there is waste in the above process in that the unused portion of the film that is cut is simply discarded.

Therefore, there is disclosed an off-axis rubbing process, in which the direction of movement and rubbing direction of the base film are different such that a slanted light transmission axis in a desired direction with respect to a lengthwise direction of the base film is obtained. Off-axis rubbing is typically performed by diagonally moving across the base film with a rotating rubbing cloth.

Korean Laid-Open Patent No. 2000-12120 discloses a method related to the off-axis rubbing process. That is, a method is disclosed in which some of the base rollers are set to be off-axis such that some of the base films are positioned diagonally with respect to rotating rubbing cloths. However, this and other conventional processes that use off-center rubbing have many drawbacks.

In particular, the conventional off-center rubbing process cannot exceed a rubbing angle of 60°, and it is not possible to realize a rubbing angle of 90° or greater. Because of this limitation in the applicable rubbing angle, there are also limits in the variety of light transmission axes that can be obtained for the produced optical compensation films.

Further, with the diagonal positioning of some of the base films, it is possible to form an orientation surface on the base films in an unintended direction, or for friction to be generated such that creases are formed in the base films. This negatively affects the quality and evenness of the liquid crystal material coated on the base films.

Finally, it is difficult to realize various rubbing angles and to freely adjust the rubbing angle with the use of conventional off-axis rubbing. This rules out the possibility of performing a roll-to-roll process to combine the films of the optical compensation film, the polarization film, and other optical compensation films. Hence, manufacture remains complicated and production costs remain high.

SUMMARY OF THE INVENTION

It is one object of the present invention to provide a rubbing device that allows for the realization of various rubbing angles and easy adjustment of the rubbing angle such that optical compensation films may be manufactured that can be used in various types of liquid crystal displays, and that enables interconnection of an optical compensation film, a polarization film, and other optical compensation films using a continuous roll-to-roll process to thereby simplify the overall manufacturing process.

In one embodiment, the present invention provides a rubbing device including a base roller assembly that suspends and otherwise supports a base film to convey the same in one direction; a rubbing roller assembly that suspends and otherwise supports a rubbing cloth, and that moves the rubbing cloth in a direction opposite a conveying direction of the base film to thereby realize a rubbing treatment by contact between the rubbing cloth and the base film; and a rotating apparatus provided under the rubbing roller assembly and that rotates the entire rubbing roller assembly to a particular angle within the range of 0~180° in the clockwise or counterclockwise direction with respect to the conveying direction of the base film.

The base roller assembly includes first and second guide rollers that support the base film and prevent slipping of the same, and a touch roller that contacts the base film to the rubbing cloth. Preferably, an adhesive is provided on an outer surface of the first and second guide rollers to prevent slipping of the base film.

The rubbing roller assembly includes a drive roller that is rotated by a motor, a tension guide roller that provides tension to the rubbing cloth, and a guide roller that guides the rubbing cloth. Preferably, a crease-prevention plate is provided at a location between the drive roller and the guide roller to prevent the generation of creases in the rubbing cloth.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
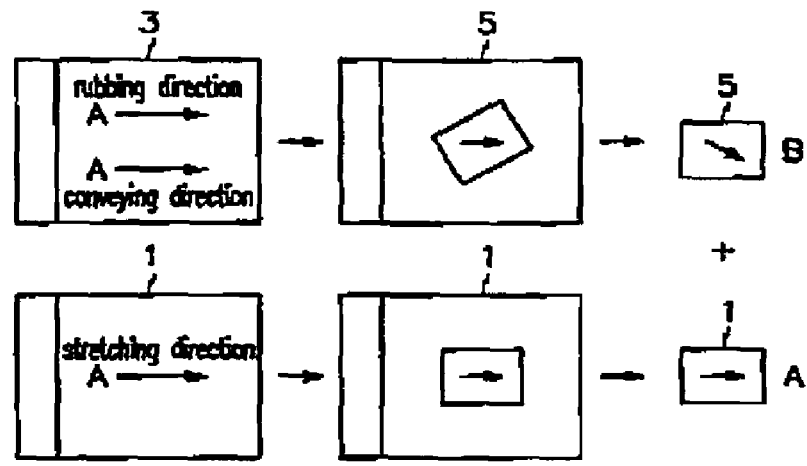
FIG. 1 is a schematic view of a conventional process to combine an optical compensation film and a polarization film.
Figure 2:
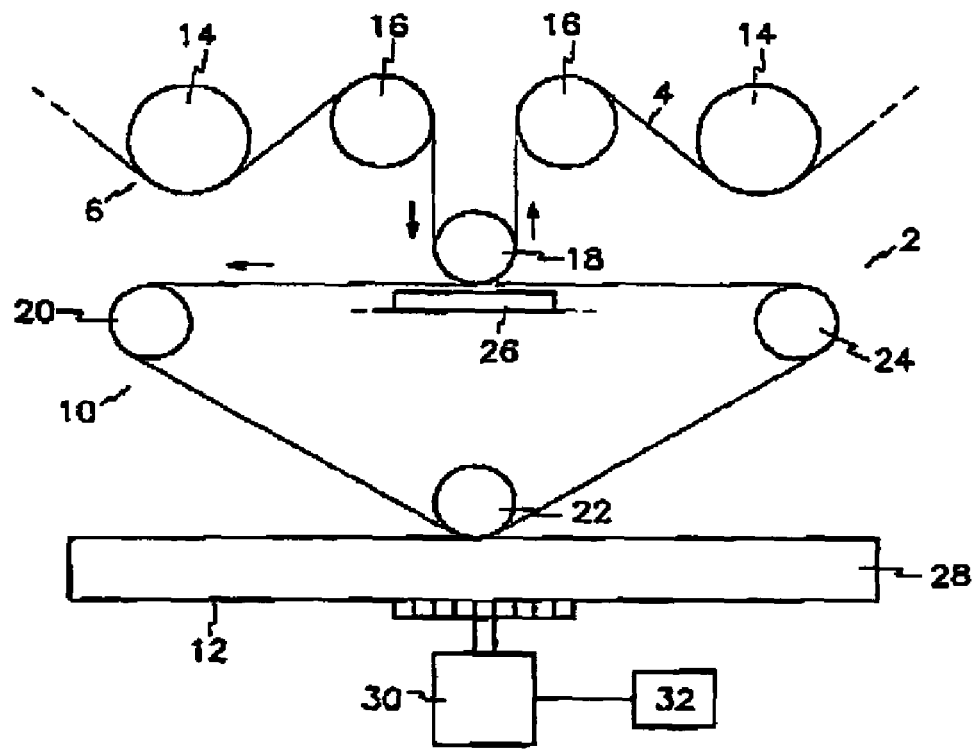
FIG. 2 is a side view of a rubbing device according to a preferred embodiment of the present invention.

FIG. 2 is a side view of a rubbing device according to a preferred embodiment of the present invention. A rubbing device 2 includes a base roller assembly 6 that suspends and otherwise supports a base film 4 to convey the same; a rubbing roller assembly 10 that suspends and otherwise supports a rubbing cloth 8, and that moves the rubbing cloth 8 in a direction opposite a conveying direction of the base film 4; and a rotating apparatus 12 that rotates the entire rubbing roller assembly 10 to vary a rubbing angle.

The base roller assembly 6 includes first and second guide rollers 14 and 16 that support the base film 4 and prevent slipping of the same, and a touch roller 18 that contacts the base film 4 to the rubbing cloth 8 and varies a rubbing depth and a rubbing length. The base film 4 is a polymer film such as polyethylene terephthalate (PET) or cellulose triacetate (TAC) that is flexible to allow for a roll-to-roll rubbing treatment.

Figure 3:
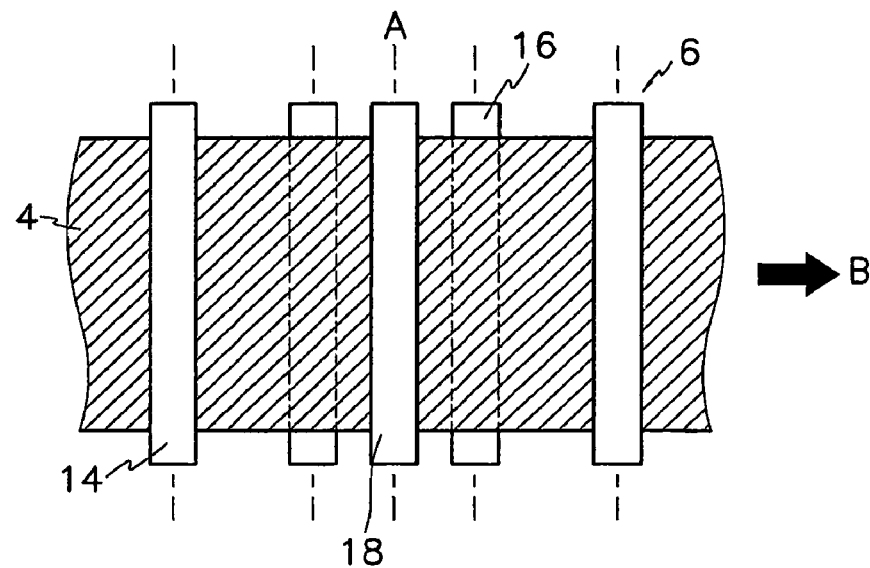
FIG. 3 is a plan view of a base film and a base roller assembly of FIG. 2.

With reference also to FIG. 3, the first guide roller 14, the second guide roller 16, and the touch roller 18 are arranged with their rotational axes all in direction A such that the base film 4 is moved in direction B, which is perpendicular to direction A. The entire base roller assembly 6 is driven by a winder (not shown), and a conveying speed and degree of tension in the base film 4 may be controlled by the rotating speed of the winder.

The rubbing roller assembly 10 that supports the rubbing cloth 8 includes a drive roller 20 that is rotated by a motor (not shown), a tension guide roller 22 that provides tension to the rubbing cloth 8 to prevent the formation of creases in the rubbing cloth 8, and a guide roller 24 that acts to guide the rubbing cloth 8. The tension guide roller 22 can be moved up and down (in FIG. 2) to adjust the tension in the rubbing cloth 8. Also, a crease prevention plate 26 is provided at a location between the drive roller 20 and the guide roller 24, which prevents the generation of creases in the rubbing cloth 8 that would reduce the effectiveness of the same.

Figure 4:
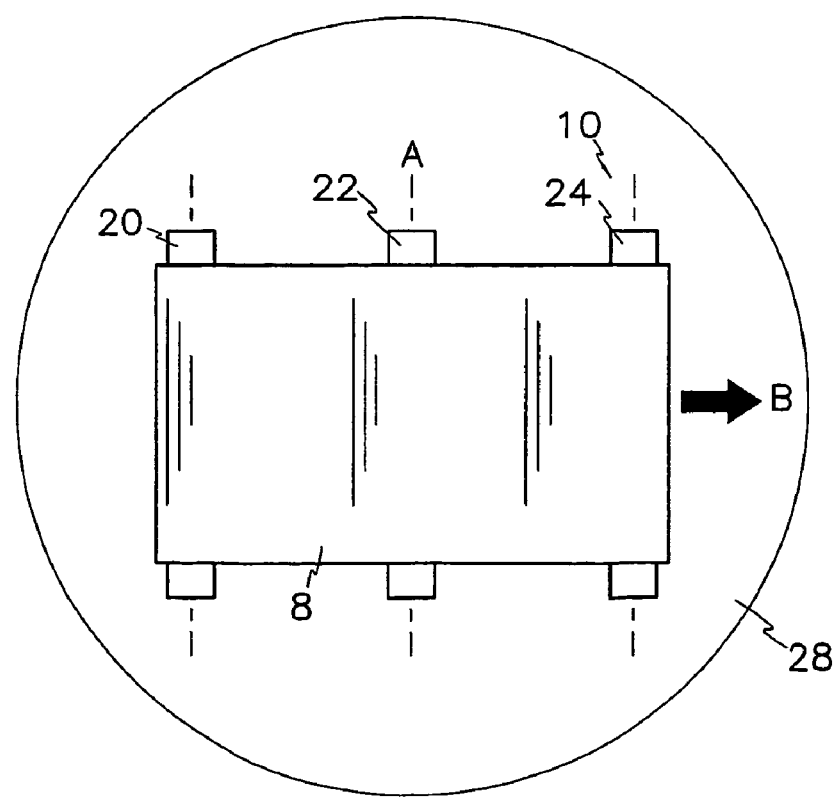
FIG. 4 is a plan view of a rubbing cloth and a rubbing roller assembly of FIG. 2.

Referring to FIG. 4, the drive roller 20, the guide roller 24, and the tension guide roller 22 are also arranged with their rotational axes in direction A such that the rubbing cloth 8 is conveyed along direction B. With the elements of the rubbing roller assembly 10 being arranged in the same manner as the elements of the base roller assembly 6, a rubbing angle, which is the angle between the conveying directions of the base film 4 and the rubbing cloth 8, is 0°.

The entire rubbing roller assembly 10 is rotated by the rotating apparatus 12, which is provided under the rubbing roller assembly 10, to thereby vary a rotating axis of the rubbing roller assembly 10. The rotating apparatus 12 includes a rotating plate 28 on which the rubbing roller assembly 10 is fixed, a drive motor 30 that rotates the rotating plate 28, and a controller 32 that controls a degree of rotation (i.e., a rotating angle) of the rotating plate 28.

Figure 5:
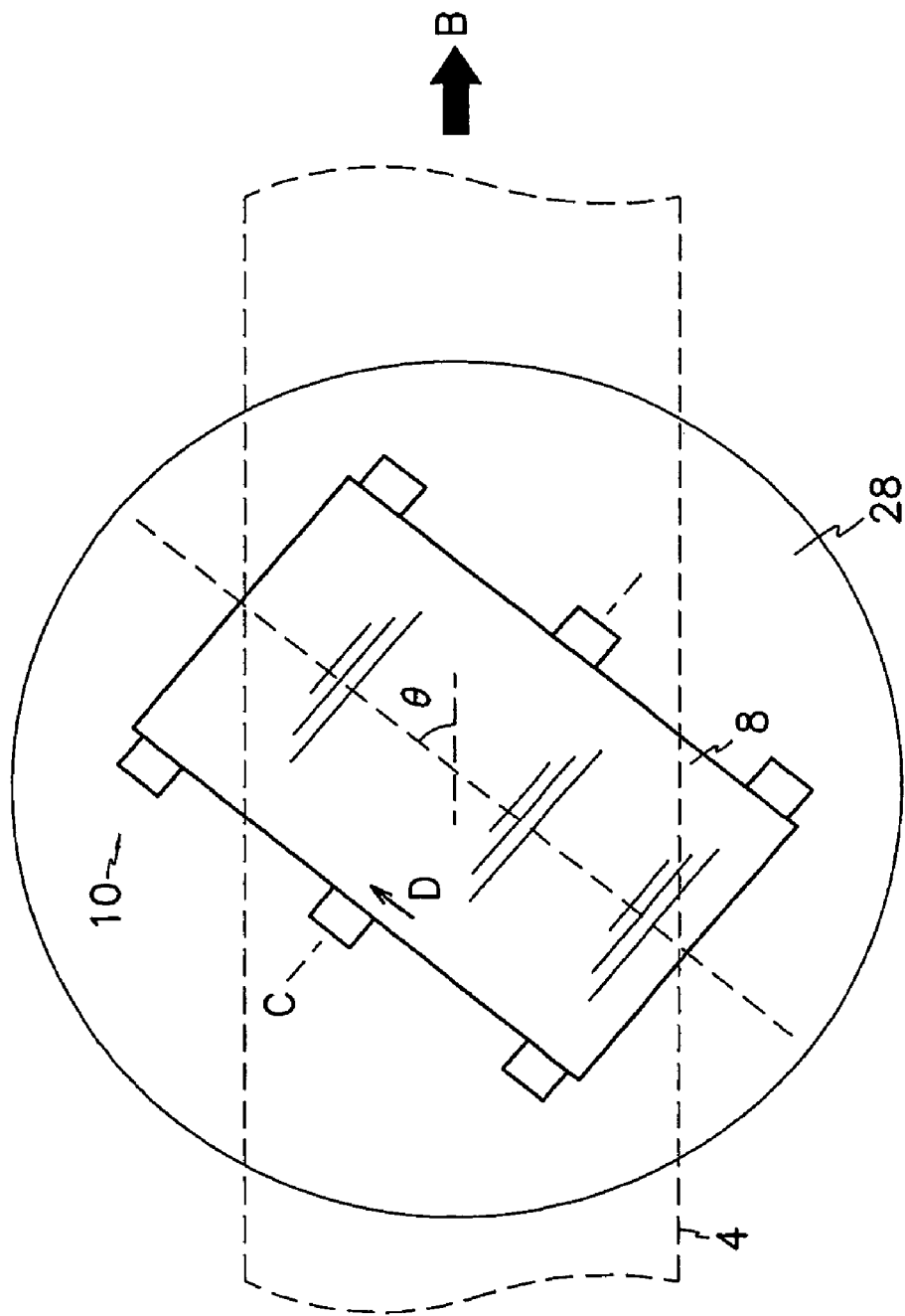
FIGS. 5 and 6 are plan views showing a rubbing cloth and a rubbing roller assembly of FIG. 2 in a state of being rotated by a rotating apparatus.
Figure 6:
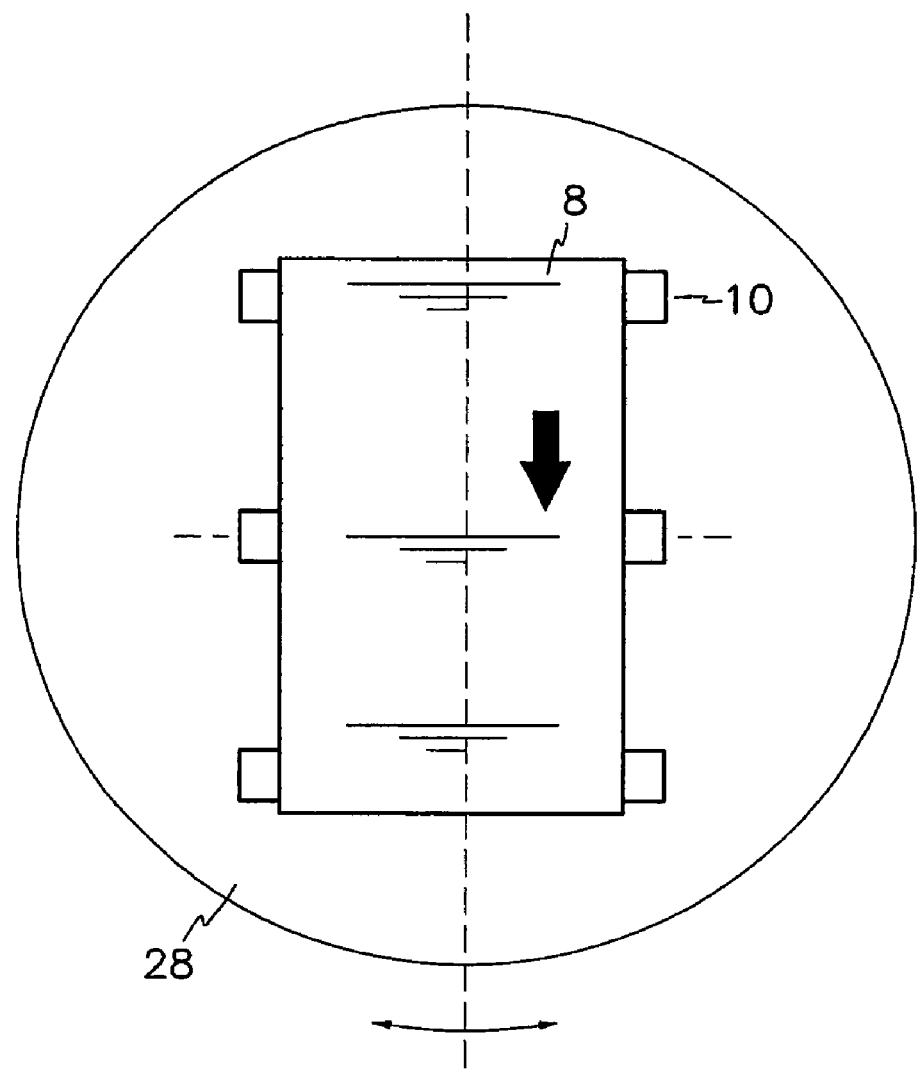

With the operation of the rotating apparatus 12, with reference to FIG. 5, the entire rubbing roller assembly 10 is rotated a predetermined angle in a counterclockwise direction (for example). As a result, a rotating axis of the rubbing roller assembly 10 is changed to direction C so that the conveying direction of the rubbing cloth 8 is in direction D. A rubbing angle of θ is, therefore, formed between direction B of the base film 4 and direction D of the rubbing cloth 8.

In the preferred embodiment of the present invention, a rubbing angle of 90° is easily realized. The rotating apparatus 12 is able to change the rubbing direction with respect to the base film 4 in a range of 0~180° in both the clockwise and counterclockwise directions.

Therefore, in the preferred embodiment of the present invention, the conveying direction of the rubbing cloth 8 is easily changed by operation of the rotating apparatus 12 and without requiring re-positioning of the base film 4, and an optical compensation film having various light transmission axes may be easily produced. Further, the interconnection of the optical compensation film, the polarization film, and other optical compensation films may be formed in a roll-to-roll process to thereby simplify production.

Figure 7:
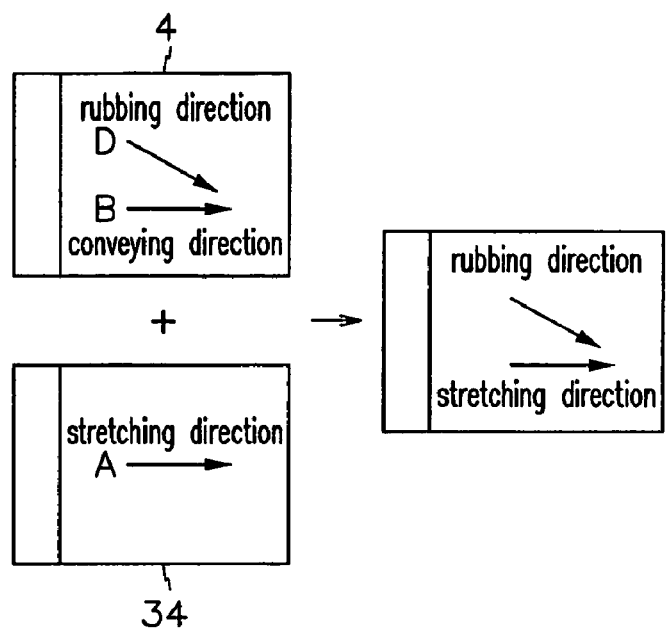
FIG. 7 is a schematic view of a process to combine an optical compensation film and a polarization film according to a preferred embodiment of the present invention.

In particular, with reference to FIG. 7, a rubbing treatment is performed using the rubbing device 2 in direction D with respect to the conveying direction (direction B) of the base film 4. Subsequently, a liquid crystal material is deposited on the base film 4 to thereby produce an optical compensation film. Next, a polarization film 34, which is tensed in direction A, is adhered to the optical compensation film and the films are combined through a continuous roll-to-roll process.

Therefore, an optical compensation film, a polarization film, and other optical compensation films may be combined in a continuous process, and the resulting film is cut to obtain the final product. With this capability, the film utilization efficiency is improved, and production is made easy to reduce overall manufacturing costs. Further, since the rubbing angle is easily varied by operating the rotating apparatus 12, optical compensation films having various light transmission axes may be easily produced in a continuous roll-to-roll process.

Figure 8:
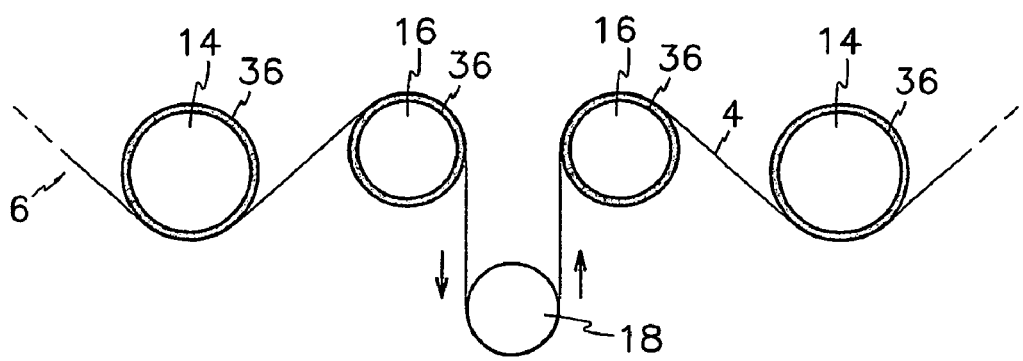
FIG. 8 is a side view of a base roller assembly according to another preferred embodiment of the present invention.

In the case where the rubbing direction is different from the direction that the base film 4 is conveyed, it is possible for the base film 4 to slip or for creases to form on the base film 4 as a result of friction that is produced between the base film 4 and the rubbing cloth 8. Therefore, with reference to FIG. 8, an adhesive 36 such as silicon rubber is applied to an outer surface of the first and second guide rollers 14 and 16 to thereby prevent the problem of slipping of the base film 4 or the formation of creases thereon.

Figure 9:
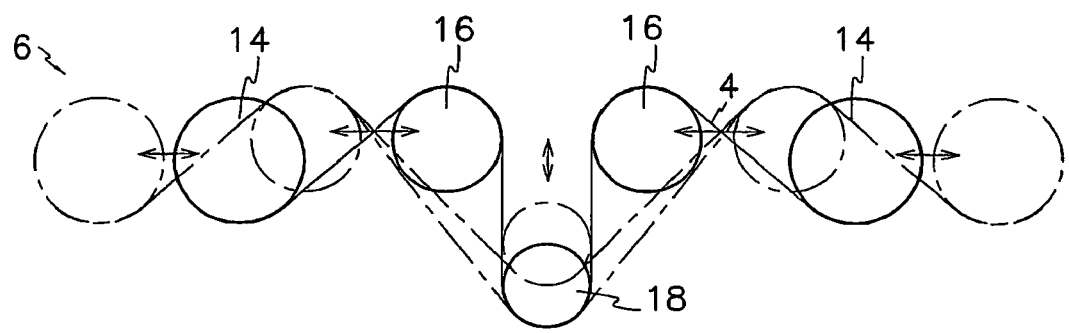
FIG. 9 is a plan view of a base roller assembly according to another preferred embodiment of the present invention.
Figure 10:
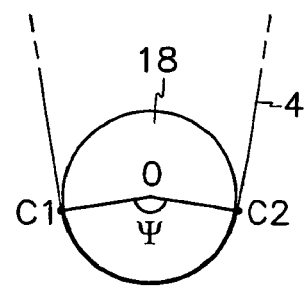
FIG. 10 is a schematic view used to describe a superposition angle of a base film.

Further, with reference to FIG. 9, the positions of the first guide roller 14, the second guide roller 16, and the touch roller 18 are changed to adjust a superposition angle of the base film 4. As a result, rubbing length, rubbing depth, rubbing density, etc. are easily controlled. As shown in FIG. 10, the superposition angle (Ψ) is defined by the angle between two lines drawn from a center (O) of the touch roller 18 to two points C1 and C2 where the base film 4 initially makes contact with the touch roller 18.

In more detail, the first and second guide rollers 14 and 16 are moveably provided so that they may be positioned closer together or farther apart (i.e., so that they can be moved in a horizontal direction in FIG. 2), and the touch roller 18 is provided so that its position may be varied with respect to the rubbing cloth (i.e., so that it may be moved vertically in FIG. 2).

With such varying of the positions of the rollers 14, 16, and 18, the superposition angle (Ψ) may be varied in the range of 0~270°. The rubbing length, rubbing depth, rubbing density, etc. may be adjusted by varying the superposition angle (Ψ).

Figure 11:
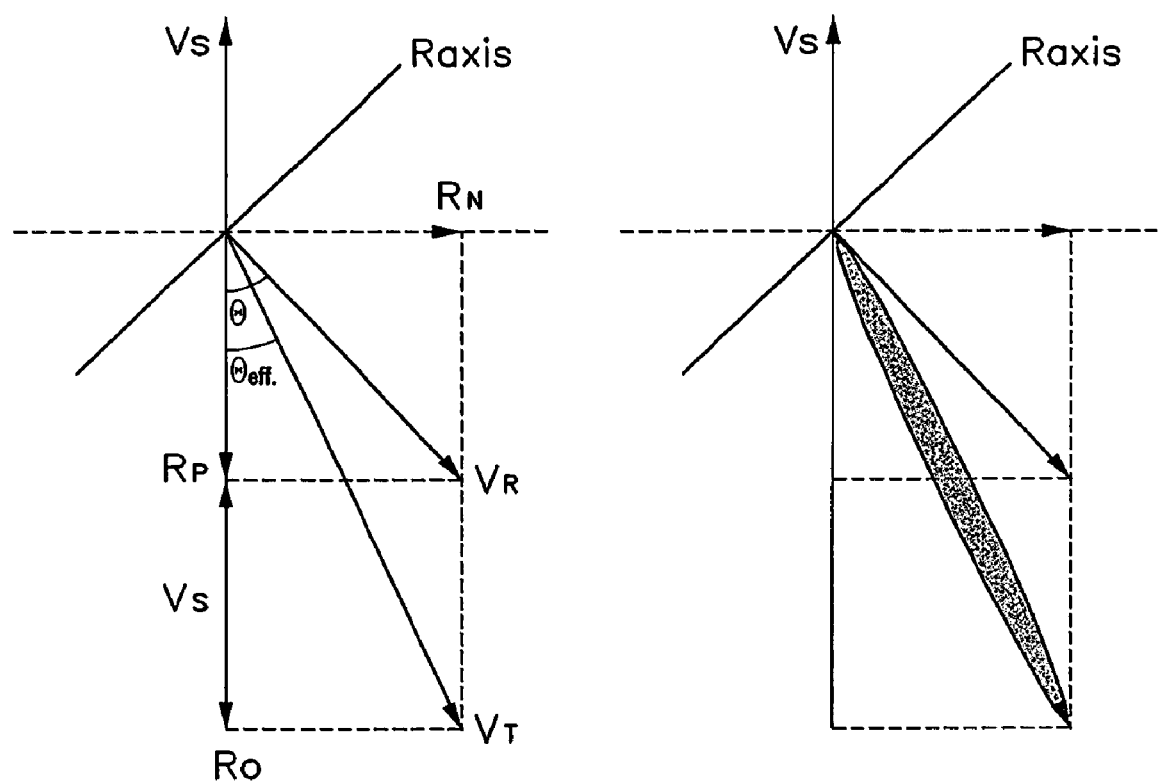
FIG. 11 shows schematic views used to describe a rubbing angle and rubbing speed of an optical compensation film.

In FIG. 11, Vs indicates a conveying speed of the base film, and Raxis indicates a rotating axis of the rubbing cloth 8 that is slanted by as much as the rubbing angle θ with respect to a conveying direction of the base film 4. Further, the rubbing speed Vs is divided into a component $R_P$ that is parallel to the conveying direction of the base film 4, and a component $R_N$ that is normal to the conveying direction of the base film 4.

Since the rubbing cloth 8 is rotated in a direction opposite the conveying direction of the base film 4, a rubbing speed Ro that is parallel with the actual conveying direction of the base film 4 is calculated by the following equation.

$$R_O = R_P - V_S \qquad \text{[Equation 1]}$$

Accordingly, a total rubbing speed $V_T$ and an effective rubbing angle Θ eff are as shown respectively in Equations 2 and 3 below.

$$V_T = \sqrt{R_O^2 + R_N^2} \qquad \text{[Equation 2]}$$

$$\Theta_{eff} = \arcsin\left(\frac{R_N}{V_T}\right) \qquad \text{[Equation 3]}$$

The rubbing length is proportional to the superposition angle (Ψ), a diameter of the touch roller 18, and rubbing speed, and it is inversely proportional to the conveying speed of the base film 4. Accordingly, a contact time (t) and a rubbing length (lt) of the base film 4 and the rubbing cloth 8 are respectively as shown in Equation 4 and Equation 5 below.

$$t = \frac{(\pi d \Psi / 360)}{V_S} \qquad \text{[Equation 4]}$$

$$l_t = V_T \times t \qquad \text{[Equation 5]}$$

In the preferred embodiment of the present invention, in order to orient liquid crystal material on the base film 4 in the best possible direction, the various variables in the above equations are manipulated, and the most effective rubbing angle, rubbing depth, etc. are easily obtained.

With the use of the rubbing device of the present invention, the rubbing angle may be easily varied in the range of 0~180° in both the clockwise and counterclockwise directions such that an optical compensation film that can be used in various types of LCDs may be produced. Further, the interconnection of the optical compensation film, the polarization film, and other optical compensation films may be formed in a roll-to-roll process to thereby simplify production.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A rubbing device, comprising:
 a base roller assembly that suspends and otherwise supports a base film to convey the same in one direction;
 a rubbing roller assembly that suspends and otherwise supports a rubbing cloth, and that moves the rubbing cloth in a direction opposite a conveying direction of the base film to thereby realize a rubbing treatment by contact between the rubbing cloth and the base film; and
 a rotating apparatus provided under the rubbing roller assembly and that rotates the entire rubbing roller assembly to a particular angle greater than 0° and up to and including −180° in the clockwise or counterclockwise direction with respect to the conveying direction of the base film.

2. The rubbing device of claim 1, wherein the base roller assembly includes first and second guide rollers that support the base film and prevent slipping of the same, and a touch roller that contacts the base film to the rubbing cloth.

3. The rubbing device of claim 1, wherein the base film is polyethylene terephthalate (PET) or cellulose triacetate (TAC).

4. The rubbing device of claim 2, wherein the first guide roller, the second guide roller, and the touch roller are arranged with rotational axes thereof all in an identical direction such that the base film is conveyed in a direction perpendicular to the direction of the rotational axes of the first guide roller, the second guide roller, and the touch roller.

5. The rubbing device of claim 2, further comprising an adhesive that is provided on outer surfaces of the first and second guide rollers to prevent slipping of the base film.

6. The rubbing device of claim 5, wherein the adhesive is silicon rubber.

7. The rubbing device of claim 2, wherein the first guide roller, the second guide roller, and the touch roller are able to be re-positioned in a horizontal or vertical direction to adjust superposition angle of the base film.

8. The rubbing device of claim 7, wherein the first and second guide rollers are moved in a horizontal direction to have relative positions closer together or farther apart.

9. The rubbing device of claim 7, wherein the touch roller is moved in up and down directions to be positioned closer to or farther from the rubbing cloth.

10. The rubbing device of claim 1, wherein the rubbing roller assembly includes a drive roller that is rotated by a motor, a tension guide roller that provides tension to the rubbing cloth, and a guide roller that guides the rubbing cloth.

11. The rubbing device of claim 10, wherein the tension guide roller is moved up and down to adjust a tension in the rubbing cloth.

12. The rubbing device of claim 10, further comprising a crease prevention plate provided at a location between the drive roller and the guide roller, the crease prevention plate preventing the generation of creases in the rubbing cloth.

13. The rubbing device of claim 10, wherein the drive roller, tension guide roller, and guide roller are arranged with rotational axes in an identical direction such that the rubbing cloth is conveyed in a direction perpendicular to the direction of the rotational axes of the drive roller, tension guide roller, and guide roller.

14. The rubbing device of claim 1, wherein the rotating apparatus includes a rotating plate on which the rubbing roller assembly is fixed, a drive motor that rotates the rotating plate, and a controller that controls a rotating angle of the rotating plate.

* * * * *